Feb. 14, 1928.
J. J. SULLIVAN
1,659,124
TWINE CUTTER
Filed Feb. 11, 1926 — 4 Sheets-Sheet 1
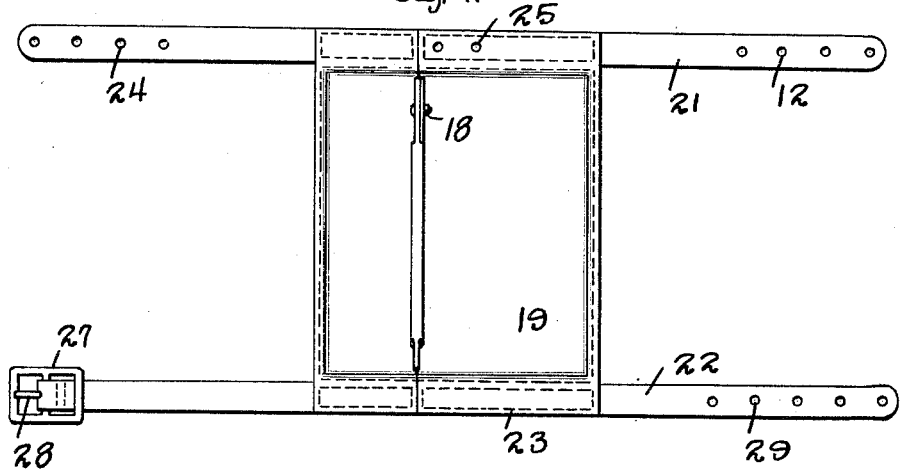
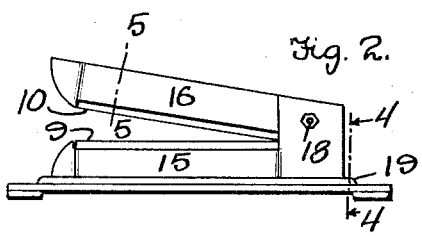
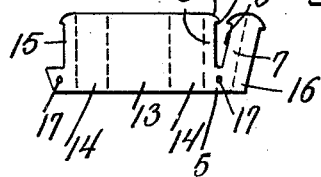
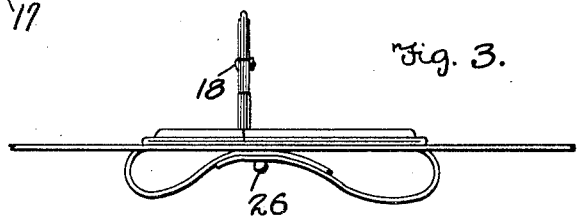
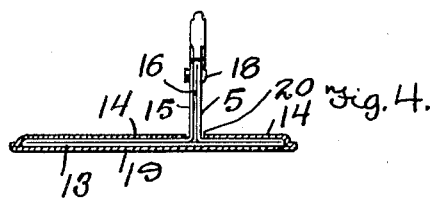
James J. Sullivan, INVENTOR.
BY Richard B. Owen ATTORNEY.
Witnesses

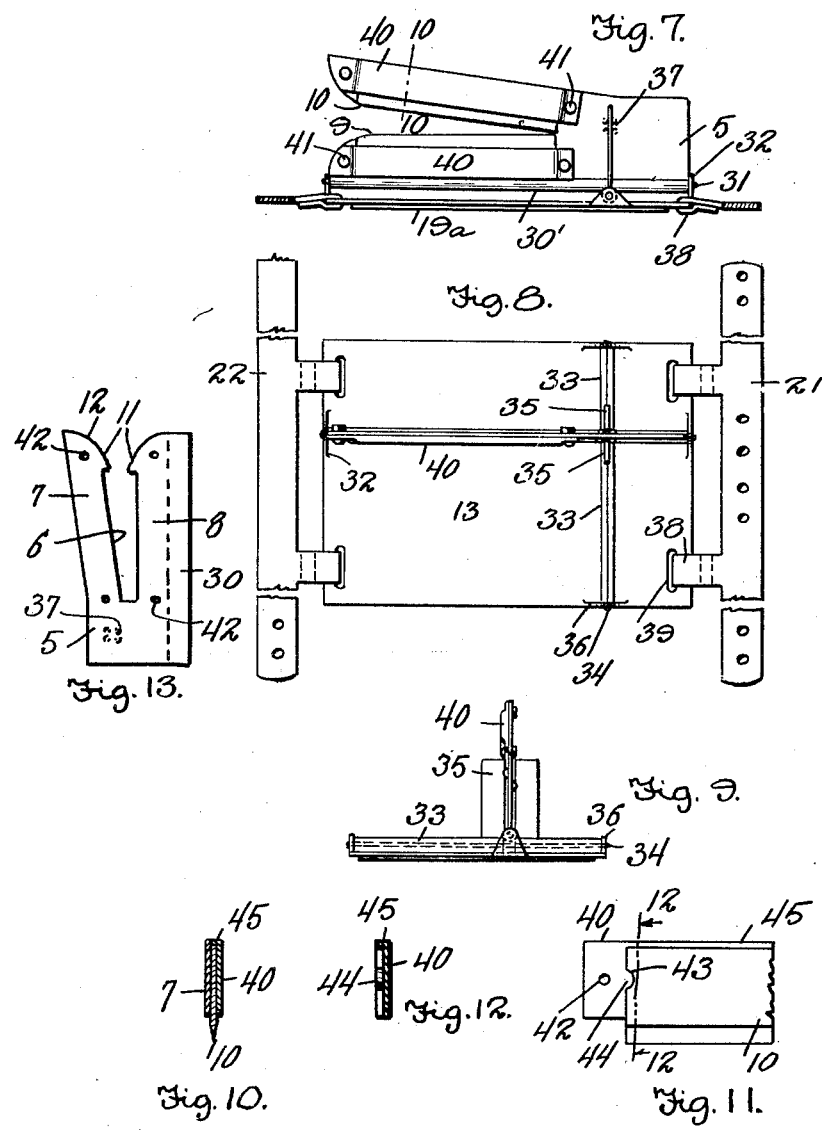

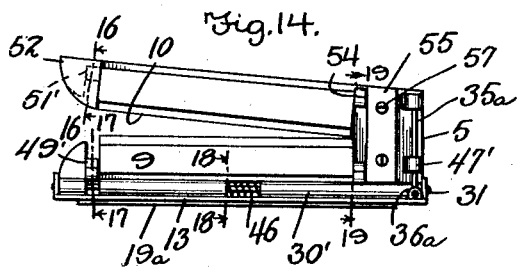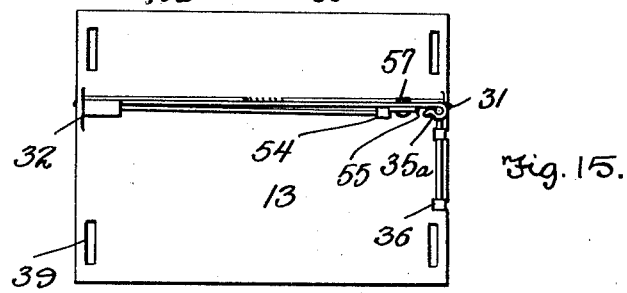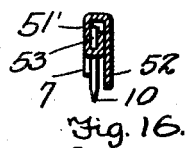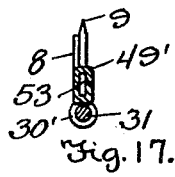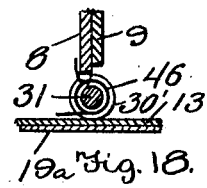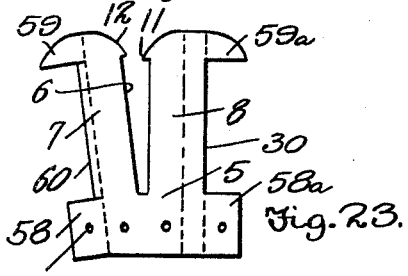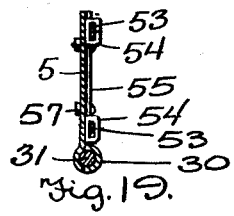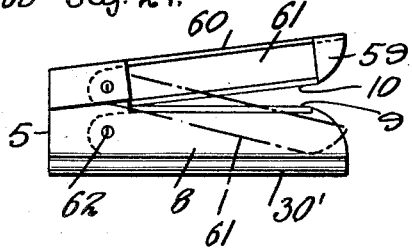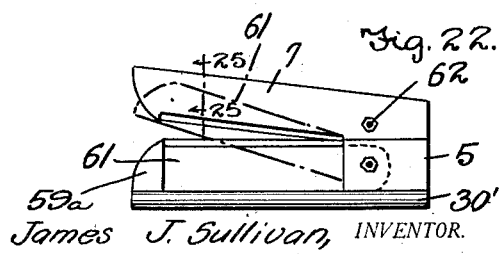

Feb. 14, 1928.
J. J. SULLIVAN
TWINE CUTTER
Filed Feb. 11, 1926 4 Sheets-Sheet 4
1,659,124
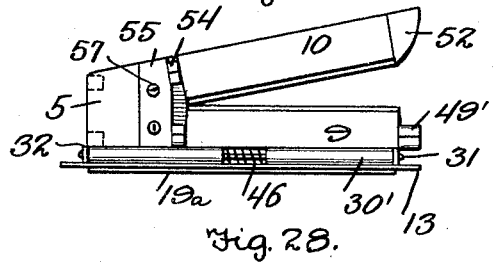
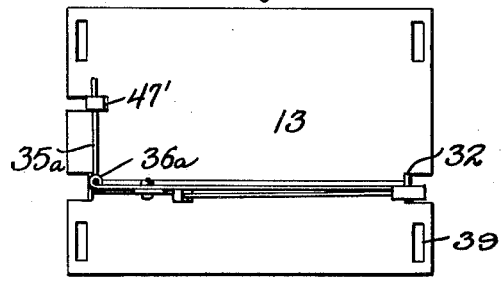
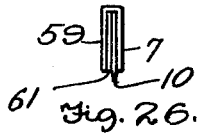
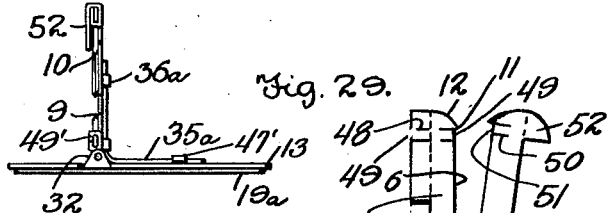
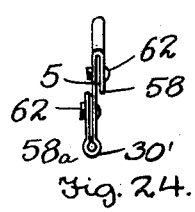
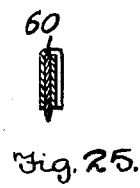
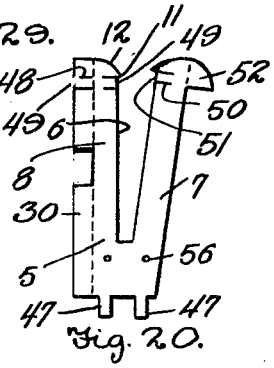
James J. Sullivan,
INVENTOR.
BY Richard B. Owen
ATTORNEY.
Witnesses Patented Feb. 14, 1928.

1,659,124

UNITED STATES PATENT OFFICE.

JAMES J. SULLIVAN, OF FARIBAULT, MINNESOTA.

TWINE CUTTER.

Application filed February 11, 1926. Serial No. 87,617.

This invention relates to cutlery, and has more particular reference to a device for cutting twine or the like so as to facilitate tying and opening of packages.

The primary object of the invention is to provide a twine cutter which is simple and durable in construction as well as efficient in operation.

Another object is to provide a novel twine cutter which may be effectively and conveniently attached to the back of the hand so as to be positioned for convenient and effective use at all times without interfering with the use of such hand in performing other operations such as the wrapping or un-wrapping of articles.

Still another object is to provide a twine cutter of the above kind embodying a simple and durable form of blade holder capable of being cheaply and easily constructed from sheet metal so as to effectively hold a pair of cutting blades with their cutting edges adjacent and in converging relation whereby the twine may be readily led between the cutting edges and effectively severed or cut.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 1 is a top plan view of one form of twine cutter embodying the present invention;

Figure 2 is a side elevational view looking toward the left of Figure 1;

Figure 3 is an end elevational view looking toward the right of Figure 2, and with one of the attaching straps in attaching condition;

Figure 4 is a transverse section taken upon line 4—4 of Figure 2;

Figure 5 is a sectional view taken upon line 5—5 of Figure 2;

Figure 6 is a plan view of the blank from which the blade holder and its supporting base are formed in the construction of the device shown in Figure 1, the blank being drawn on a small scale;

Figure 7 is a view somewhat similar to Figure 2 of a modified form of the invention;

Figure 8 is a view similar to Figure 1 of the device shown in Figure 7;

Figure 9 is an end elevational view looking toward the left of Figure 7;

Figure 10 is a sectional view taken upon line 10—10 of Figure 7;

Figure 11 is an enlarged detail view illustrating an end portion of one of the clamping plates and the associated cutting blade of the device shown in Figure 7;

Figure 12 is a sectional view taken upon line 12—12 of Figure 11 with the blade removed;

Figure 13 is a plan view of the blank from which the main blade holder plate of the device shown in Figure 7 is formed;

Figure 14 is a view similar to Figure 7 of a further modified form of the invention with the attaching straps removed;

Figure 15 is a top plan view of the device shown in Figure 14;

Figure 16 is an enlarged section taken upon line 16—16 of Figure 14;

Figure 17 is a sectional view taken upon line 17—17 of Figure 14;

Figure 18 is a fragmentary section taken upon line 18—18 of Figure 14;

Figure 19 is a transverse section taken upon line 19—19 of Figure 14 with the base plate removed;

Figure 20 is a plan view of the blank from which the main member of the blade holder of the device shown in Figure 14 is formed;

Figure 21 is a side elevational view of a further modified form of blade holder adapted for use with the base plate of Figure 7 in lieu of the blade holder employed in the latter figure;

Figure 22 is a view similar to Figure 21 looking at the other side of the blade holder shown in the latter figure;

Figure 23 is a plan view of the blank from which the blade holder of Figures 21 and 22 is formed;

Figure 24 is an end elevational view looking toward the left of Figure 22;

Figure 25 is a transverse section taken upon line 25—25 of Figure 22;

Figure 26 is an end elevational view of one of the arms of the blade holder shown in Figures 21 and 22;

Figure 27 is a view similar to Figure 14 and illustrating a slightly modified form of the embodiment of the invention illustrated in said Figure 14;

Figure 28 is a top plan view of the device shown in Figure 27; and

Figure 29 is an end elevational view looking toward the left of Figure 27.

Referring more in detail to the drawings, each form of the invention embodies a blade holder including a main member or plate 5 formed with an elongated longitudinal substantially V-shaped notch 6 whereby the plate 5 is bifurcated to provide a pair of arms 7 and 8 which diverge from their point of connection and are adapted to have a cutting blade flatly disposed against corresponding sides thereof so that the cutting edges of the blades are adjacent and exposed in converging relation within the notch 6 as clearly shown in the several side elevational views. The blade associated with the arm 8 is indicated at 9 while the blade associated with the arm 7 is indicated at 10, and various means may be provided for securing the blades in place against the arms 7 and 8 as will presently be described. In each form of the invention, the free end portions of the arms 7 and 8 are provided with lateral extensions 11 upon their inner edges, and further have their inner edges rounded or beveled as at 12 in forwardly or outwardly diverging relation so as to provide a flared entrance for effectively guiding the cord in between the cutting edges of the knives 9 and 10, the curved or beveled edges 12 terminating at their inner ends flush with the cutting edges of the knives as clearly shown.

In each form of the invention the blade holder is carried by or adapted to be carried by a base plate 13 having means for securing the same flatly against the back of the hand of the user, the knife holder extending or being arranged longitudinally of and perpendicularly to the base plate 13 when the device is in use. In the form of the invention shown in Figures 1 to 6 inclusive, the base plate and blade holder are preferably formed from a single sheet of metal stamped in the form shown clearly in Figure 6 so as to provide flaps or wings 14 upon opposite sides or longitudinal edges of the base plate 13, the outer edge of one of the wings 14 being integrally joined with the outer edge of the arm 8 of the plate 5. The blank further embodies an end wing or flap 15 similar in form to the arm 8 and the arm connecting portion of the plate 5 and joined along its inner edge with the outer edge of the other wing 14, and a second end flap 16 similar in form to the arm 7 and joined at its inner edge with the outer edge of said arm 7 as clearly shown in Figure 6. In shaping the blank, the flap 16 is folded onto the arm 7 and the plate member 5 and flap 15 are bent at right angles to the wings 14, whereupon said wings 14 are folded onto the upper surface of the base plate 13 so as to bring the flap 15 and plate member 5 together extending upwardly from the base plate 13 as clearly shown in Figure 4. It will thus be seen that when the blade 10 is forced into position between the arm 7 and the flap 16 it will be effectively held in place by friction and the inherent clamping action obtained, while the blade 9 will be similarly held between the flap 14 and the arm 8. In order to more rigidly secure the blades in position, the arm connecting portion of the plate member 5 and the similar portion of the flap 15 are provided with transverse apertures 17 through which is passed a bolt 18 having a nut threaded thereon. In this way when the nut is tightened the flaps 15 and 16 are drawn tightly against the blades and the latter are consequently drawn tightly against the arms 7 and 8 so as to be effectively held in place. A casing or envelope 19 of leather or other suitable strong non-metallic material is constructed to encase the base plate 13 and the wings 14 so as to provide a layer of material between the back of the hand and the base plate 13 when the device is in use whereby said base plate will not cause injury to the user's hand, attachment of the twine cutter to the layer of material being at the same time effected. The blade holder projects upwardly through a longitudinal slot 20 in the envelope or casing as clearly shown in Figure 4 so as to be exposed for use, and suitable means is carried by the envelope or casing 19 to effect attachment of the device to the hand. This attaching means preferably embodies a pair of transverse attaching straps 21 and 22 having their intermediate portions stitched to the under side of the ends of the envelope as indicated at 23. The attaching strap 21 has a longitudinal series of apertures 24 in each end, and the intermediate portion of the strap 21 and the adjacent end portion of the envelope 19 are provided with a longitudinal series of openings as at 25, whereby, upon engaging a headed stud or button 26 in a desired one of the apertures 25 and desired ones of the end apertures 24, the strap 21 may be disposed as shown in Figure 3 to provide a pair of loops each adapted to receive one or more of the fingers of the user's hand, as desired. The loops may be obviously adjusted in size to suit requirements, and the strap 22 is an ordinary attaching strap adapted to pass about the wrist of the user's hand and to have its ends detachably and adjustably connected. For adjustably and detachably connecting the ends of the strap 22, a buckle may be provided as at 27 upon one end of the strap 22 for engagement with the other end of the latter, and in the instance shown, the buckle 27 has a conventional form of swinging tongue 28 adapted to pass through any desired one of a longitudinal series of openings or apertures 29 provided in the other end of the strap 22.

It will thus be seen that with the device attached to the back of the hand, the same will be in position for convenient use at all times so that upon exerting a rearward pull, a piece of twine passed between the blades 9 and 10 will be effectively severed. However, the strap 21 may be attached to the end of the envelope 19 to which the strap 22 is illustrated as being attached, and the strap 22 may be attached to the end to which the strap 21 is illustrated as attached, in which case the blades will be positioned in forwardly diverging relation whereby a forward pushing movement imparted to the hand is necessary for severing the twine as distinguished from a rearward or pulling movement as mentioned above with the arrangement of the straps as shown.

In the construction shown in Figures 7 to 13 inclusive, the base plate 13, instead of being encased in an envelope of protecting material, simply has a sheet of leather or other protecting material 19ª glued or otherwise secured to its under surface. In this form of the invention, also, the main member or plate 5 of the blade holder is constructed from a sheet of metal separate from the base plate 13 so as to simply embody the arms 7 and 8 and an integral wing joined along its inner longitudinal edge with the outer longitudinal edge of the arm 8 and indicated at 30. This wing 30 is adapted to be bent to form a longitudinal tubular bearing 30′ along the bottom or outer edge of the arm 8, and extending through this bearing is a supporting rod or shaft 31 whose ends project beyond the ends of the bearing 30′ and are suitably journaled in longitudinally aligned ears 32 formed on the ends of the base plate 13. The blade holder is thus mounted on the base plate for lateral swinging movement so as to be capable of being folded downwardly onto the base plate when not in use or to be positioned perpendicularly to the base plate 13 when in use as shown in Figure 7, suitable means being provided for retaining the blade holder in position perpendicularly to the base plate. As shown, this means for retaining the blade holder perpendicularly to the base plate may consist in a pair of sleeves 33 journaled upon a supporting rod or shaft 34 at opposite sides of the blade holder supporting rod 31 and having rigid lateral arms upon their inner ends as at 35, the rod 34 extending transversely of the base plate and beneath the arm connecting portion of the blade holder plate member 5 as well as having its ends supported by ears 36 provided in transverse alignment at the sides of the base plate 13. It will be seen that the ears 36 are rigid with and project upwardly from the sides of the base plates 13, and that the arms 35 are mounted to swing in longitudinal planes parallel with the blade holder. Thus, when the arms 35 are swung downwardly to a substantially horizontal position beneath the bearing sleeve 30′ of the blade holder, the latter may be swung downwardly to a substantially horizontal position onto the base plates 13 so that the device is in a compact condition and out of the way when not in use. On the other hand, when the blade holder is positioned perpendicularly to the base plate as shown, the arms 36 may be swung upwardly to a vertical position so that the blade holder is effectively held between such arms 35 in a position perpendicularly to the base plate 13 and against folding downwardly onto the latter. Sufficient friction may be had between the arms 35 and the blade holder as well as between their supporting sleeves 33 and the rod 34 to retain the parts in operative position under ordinary circumstances, but in order to more positively retain the blade holder operatively disposed, the arm connecting portion of the plate 5 may be provided with pairs of projections 37 upon opposite sides thereof between which the respective arms 35 are adapted to be sprung so that said arms 35 will be effectively held in raised position although capable of being manually released and swung downwardly. In this form of the invention the base plate 13 is provided with the attaching straps 21 and 22, but the latter, instead of being stitched to an envelope 19 as in Figure 1, are provided intermediate their ends with pairs of lateral loops 38 engaged in pairs of end slots 39 provided in the base plate 13 so as to effect attachment of said straps to the base plate 13. In this form of the invention the cutting blades 9 and 10 are preferably clamped against the corresponding sides of the arms 7 and 8 by means of separate clamping plates 40 which are similar in form, and one of which is associated with each of the arms 7 and 8. Each clamping plate 40 is bolted at its ends as at 41 to the ends of the associated arm 7 or 8, the bolts passing through suitable apertures 42 provided in the clamping plates and arms as shown. It is further noted that, in this instance, the blades 9 and 10 are provided with end notches, one of which is shown at 43 in Figure 11 and the ends of the clamping plates 40 are provided with lugs 44 adapted to seat in these notches 43 so as to more effectively retain these blades in position. The clamping plates 40 are further provided with lateral flanges 45 along their outer longitudinal edges adapted to engage the outer longitudinal edges of the blades so as to facilitate assembling of the parts and to further restrain the blades against separating displacement.

In the form of the invention shown in Figures 14 to 20 inclusive, the base plate 13 is provided with the end strap attaching slots 39 and the longitudinally aligned bearings or ears 32 in which are journaled the ends of the longitudinal supporting rod 31 for the blade holder, substantially as described with respect to the form illustrated in Figures 7 to 13 inclusive. A wing 30 is also provided on the arm 8 which is bent to form a bearing sleeve or tube 30' for reception of the supporting rod 31, but in this instance the bearing sleeve 30' is cut away intermediate its ends so as to accommodate a torsion spring 46 that encircles the intermediate portion of the rod 31 and has its ends respectively bearing against the plate member 5 of the blade holder and the upper surface of the base plate 13 as clearly shown in Figure 18. In this way the spring 46 acts to normally yieldingly swing the blade holder downwardly toward the base plate 13, so that it is merely necessary to supply means to resist the action of the spring 46 for retaining the blade holder in its operative position perpendicularly to the base plate. This latter means preferably embodies a vertically swinging arm 35ᵃ forming the inner end portion of an angularly bent rod whose outer horizontal end portion is journaled in transversely aligned bearings 36ᵃ provided upon the adjacent end of the base plate 13. The arm 35 is disposed at the side of the blade holder toward which the latter is swung by the spring 46 so when the arm 35 is positioned in upwardly extending or vertical relation to the base plate, the same effectively prevents the blade holder from swinging to folded position. In order to more effectively retain the arm 35ᵃ in upwardly swung position, the inner end of the arm connecting portion of the blade holder plate 5 is preferably provided with tongues 47 as shown in Figure 20 which are bent to form clasps 47' as shown in Figure 14 behind which the arm may be swung when raised. The form of the invention shown in Figure 14 further embodies a still different means for attaching the cutting blades to the arms 7 and 8, and as shown in Figure 20 the blade holder plate member 5 is stamped from a sheet of metal so that pairs of transverse slits 48 are provided near the free ends of the bearing forming flap 30 and the adjacent arm 8 so as to form transversely aligned tongues 49 which are bent to form a tubular keeper 49' as shown in Figure 14. In a like manner the free end portion of the arm 7 is provided with a pair of parallel transverse slits 50 extending outwardly from the inner edge of the arm and forming a tongue 51. The free end portion of the arm 7 is also provided with a lateral outwardly projecting integral wing 52 which has a curved edge corresponding to the curved end edge of the arm 7. The tongue 7 is bent outwardly upon the arm 7 and the wing 52 is folded inwardly onto the tongue 7 so as to provide a tubular keeper as at 51' (Figure 14) similar to the keeper 49', the curved edge of the wing 52 being coincident with the curved edge 12 of the arm 7 so as to preserve the flared entrance for the passage of the twine in between the knife edges. In this form of the invention, the blades or knives 9 and 10 are reduced at their ends to provide longitudinal projections 53 adjacent the back edge portions of the blades, and the projections 53 on the outer ends of the blades are adapted for slidable engagement in the tubular keepers 49' and 51' while the projections 53 on the inner ends of the blades are adapted to engage in similar tubular keepers 54 formed on an edge of a securing plate 55 adjacent the ends of the latter, the keepers 54 being formed from tongues suitably stamped from the plate 55 and bent to shape. The securing plate 55 is provided with transverse openings adapted to register with similar openings 56 in the arm connecting portion of the plate 5 for reception of clamping screws 57 whereby the securing plate 55 is attached to the plate 5 for securely holding the knives against the arms 7 and 8 when the reduced ends or projections of said knives are engaged in the several keepers. It will thus be seen that by removing the screws 57 the plate 55 may be detached by sliding the keepers 54 thereof off the projections 53 on the inner ends of the blades 9 and 10, whereupon the blades may be slid away from the free ends of the arms 7 and 8 so as to disengage the projections 53 on the outer ends of the blades from the keepers 49' and 51'. A reversal of this operation will obviously effect attachment of the blades to the blade holder.

The base 13 of each of the devices shown in Figures 7 and 14, instead of being provided with the forms of blade holders described in connection therewith, may have a blade holder of the form shown in Figures 21 to 26 inclusive. This latter form of blade holder embodies a plate member 5 with a flap 30 joined to the outer edge of the arm 8 and adapted to be shaped to provide a tubular bearing 30' for reception of the supporting rod 31 similar to the devices of Figures 7 and 14, but in this instance, a flap is provided on the outer longitudinal edge of the arm 7 including relatively wide end portions 58 and 59 adapted to be respectively folded over onto one side of the arm 7 at the ends of the latter, and a narrow intermediate portion 60 adapted to be bent at right angles to the arm 7 to provide a flange or abutment for engagement with the outer or back longitudinal edge of the blade 10 and by means of which the latter is held properly positioned on the side of the arm 7 so that the cutting edge of the blade projects inwardly beyond the inner edge of the arm 7 as shown clearly in Figure 22. End flaps 58ª and 59ª similar to the flap portions 58 and 59 are provided upon the ends of the wing 30 at the outer side of the latter and adapted to be folded onto the opposite side of the arm 8 and the arm connecting portion of the plate 5 from that upon which the flap portions 58 and 59 are folded with respect to the arm 7 and the flap connecting portion of the plate 5 as shown clearly in Figure 24. In this instance, the blades 9 and 10 are of a length to have their ends project under the flaps or flap portions 58, 59, 58ª and 59ª, and hinged at its inner end between each blade and the adjacent flap or flap portion 58 or 58ª is a swinging clamping plate 61. The clamping plate 61 associated with the arm 7 is adapted to have its outer end engaged between the flap portion 59 and the adjacent side of the blade 10 when swung upwardly from the dotted line position of Figure 21 to the full line position thereof so as to frictionally engage the blade 10 and effectively hold the latter in place against the arm 7. For this purpose the clamping plates 61 are formed of resilient material with their free end portions slightly directed away from the arms so that the same must be sprung toward the arms to be engaged under the flaps or flap portions 59 and 59ª. In a like manner, the clamping plate 61 associated with the arm 8 is adapted to be engaged between the blade 9 and the flap 59ª for a similar purpose. These clamping plates 61 are pivoted upon transverse pins or bolts 62 which extend through aligned apertures 63 provided in the flap portion 58 and the adjacent part of the plate 5 and in the flap 58ª and said portion of the plate 5. By swinging the upper clamping plate 61 downwardly to dotted line position as shown in Figure 21, the upper blade or knife 10 will be released so as to be capable of removal, and a similar result is had in connection with the blade 9 when the lower clamping plate 61 is swung upwardly to the position indicated by dotted lines in Figure 22. From the above it will be noted that the clamping plates 61 swing in planes parallel with the blades or blade holder proper, the blades being retained in place by a clasp action. It is also apparent that this form of blade holder is extremely simple in construction as well as efficient in use and composed of a minimum number of parts which are not readily liable to get out of order, provision being made whereby the insertion or removal of the blades may be effected with ease and facility.

The device shown in Figures 27 to 29 inclusive is exactly of the same construction as that shown in Figure 14 except that a slightly different form of means is provided for maintaining the blade holder at right angles to the base plate 13, and the arm 7 is shortened while the end portion of the wing 30 and the arm 8 outwardly of the tongues 49 forming the keeper 49' are eliminated. An incidental difference by reason of the above is that the ears 32 for supporting the rod 31 are provided closer together on the base plate 13, and it is noted that parts of the construction shown in Figures 27 to 29 inclusive, which are similar to those of the device shown in Figure 14, are given similar designating characters. In the construction shown in Figures 27 to 29 inclusive, the means for retaining the blade holder perpendicularly to the base plate 13 is similar to that employed in Figure 14 except that the horizontal or outer end portion of the angular rod which forms the arm 35ª is adapted to be engaged by a clasp 47' on the base plate 13, while the inner arm of the rod is journaled in bearings 36ª provided by differently forming the tongues 47 of the plate 5. In other words, the angular rod is carried by and hinged to the arm connecting portion of the plate 5 in this form of the invention and releasably engaged with the base plate 13 instead of being journaled on the base plate 13 and releasably engaged with the blade holder. Thus, in order to permit the blade holder to fold, in this instance, the outer horizontal arm 35ª of the rod will be swung against the blade holder after being dis-engaged from the clasp 47', and for maintaining the blade holder perpendicular to the base plate, the arm 35ª will be swung away from the blade holder to a position at right angles to the latter, as shown in Figure 28, the arm 35ª then being engaged under the clasp 47' and effectively preventing the spring 46 from swinging the blade holder onto the upper surface of the base plate 13.

From the foregoing description it is believed that the construction and operation as well as the advantages of the several forms of the invention will be readily understood and appreciated by those skilled in the art.

What I claim as new is:—

1. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, a base plate adapted to be secured to the back of the user's hand, means mounting the blade holder on the base plate for lateral swinging movement so that the blade holder may fold onto the upper surface of the base plate when not in use, and means to releasably retain the blade holder in upwardly swung position perpendicularly to the base plate.

2. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, a base plate adapted to be secured to the back of the user's hand, means mounting the blade holder on the base plate for lateral swinging movement so that the blade holder may fold onto the upper surface of the base plate when not in use, and means to releasably retain the blade holder in upwardly swung position perpendicularly to the base plate, and yieldable means to normally swing said blade holder to folded position upon the base plate.

3. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, a base plate adapted to be secured to the back of the user's hand, means mounting the blade holder on the base plate for lateral swinging movement so that the blade holder may fold onto the upper surface of the base plate when not in use, and means to releasably retain the blade holder in upwardly swung position perpendicularly to the base plate, said last named means embodying an angular member associated with the blade holder and the base plate and hinged to one of the same and releasably engageable with the other.

4. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, a base plate, a wing integrally connecting the base plate with one arm of said blade holder plate member and folded onto the base plate with the blade holder plate member directed upwardly at right angles thereto, a further wing joined to the opposite side of the base plate and folded onto the latter, the means for securing the blades to the blade holder plate member embodying end wings on the outer edges of the blade holder plate member and the last named wing.

5. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, said blade attaching means comprising tubular keepers on the outer ends of the arms and a plate detachably secured against the inner end of the blade holder plate member and provided with further tubular keepers, said blades having reduced ends forming projections slidably engageable in said tubular keepers.

6. In a twine cutter of the character described, a blade holder comprising a plate member formed with an elongated longitudinal notch to provide the plate member with a pair of arms which diverge toward their free ends, a pair of blades, and means associated with the plate member for securing the respective blades against sides of said arms with the cutting edges of the blades adjacent and in diverging relation, said blade attaching means comprising flap members integral with the arms and folded onto opposite sides of the latter at their ends, clamping plates having their outer ends engageable between the blades and the flaps on the outer ends of the arms, and transverse pivot pins hinging the clamping plates between the inner ends of the blades and the flaps at the inner ends of the arms.

In testimony whereof I affix my signature.

JAMES J. SULLIVAN.